United States Patent
Muggli et al.

(10) Patent No.: US 8,733,400 B2
(45) Date of Patent: May 27, 2014

(54) INLET DEVICE FOR A FLUID FED TANGENTIALLY INTO AN APPARATUS

(75) Inventors: Felix Muggli, Neftenbach (CH); Pierre Schaeffer, Winterthur (CH); Lorenzo Ghelfi, Uster (CH)

(73) Assignee: Sulzer Chemtech AG, Winterthur (CH)

( * ) Notice: Subject to any disclaimer, the term of this patent is extended or adjusted under 35 U.S.C. 154(b) by 2066 days.

(21) Appl. No.: 11/881,024

(22) Filed: Jul. 25, 2007

(65) Prior Publication Data

US 2008/0023083 A1  Jan. 31, 2008

(30) Foreign Application Priority Data

Jul. 27, 2006  (EP) ..................................... 06117972

(51) Int. Cl.
*F15C 1/16* (2006.01)
*B01D 45/16* (2006.01)
*B04C 3/06* (2006.01)

(52) U.S. Cl.
USPC .......... 137/812; 137/561 A; 137/592; 55/440; 55/442; 55/447; 95/271

(58) Field of Classification Search
USPC ......... 137/561 A, 561 R, 592, 812, 808, 809; 55/440, 442, 447, 449.1, 449; 95/269, 95/271; 261/113, 79.2; 366/336, 175.2, 366/337
See application file for complete search history.

(56) References Cited

U.S. PATENT DOCUMENTS

| | | | |
|---|---|---|---|
| 3,374,831 A * | 3/1968 | Sieverding | 165/122 |
| 4,315,815 A | 2/1982 | Gearhart | |
| 4,336,228 A | 6/1982 | Cowley | |
| 4,714,542 A | 12/1987 | Lockett | |
| 4,770,747 A * | 9/1988 | Muller | 202/176 |
| 6,341,765 B1 * | 1/2002 | Moser | 261/96 |
| 6,386,520 B2 * | 5/2002 | McEwan | 261/114.1 |
| 6,942,720 B2 * | 9/2005 | Davies et al. | 95/260 |
| 6,997,445 B2 * | 2/2006 | Vedrine | 261/96 |
| 2003/0188851 A1 | 10/2003 | Laird | |

FOREIGN PATENT DOCUMENTS

EP  1279428  1/2003

* cited by examiner

*Primary Examiner* — Steve Hepperle
*Assistant Examiner* — Atif Chaudry
(74) *Attorney, Agent, or Firm* — Francis C. Hand; Carella, Byrne et al

(57) ABSTRACT

The inlet device has a horn-shaped passage piece at a peripheral wall of a column that feeds a fluid tangentially into the column so that the fluid enters into a vortex flow that rotates around an axis adjacent to a central axis of the column. A middle zone and discharge zone of the passage piece are made in the manner of a diffuser and abut the peripheral wall to extends over less than one half of the wall. A discharge zone of the passage piece through which flow takes place presets a middle flow direction of the fluid which extends along the peripheral wall and is inclined against the main direction.

17 Claims, 2 Drawing Sheets

Fig. 1
Fig. 2
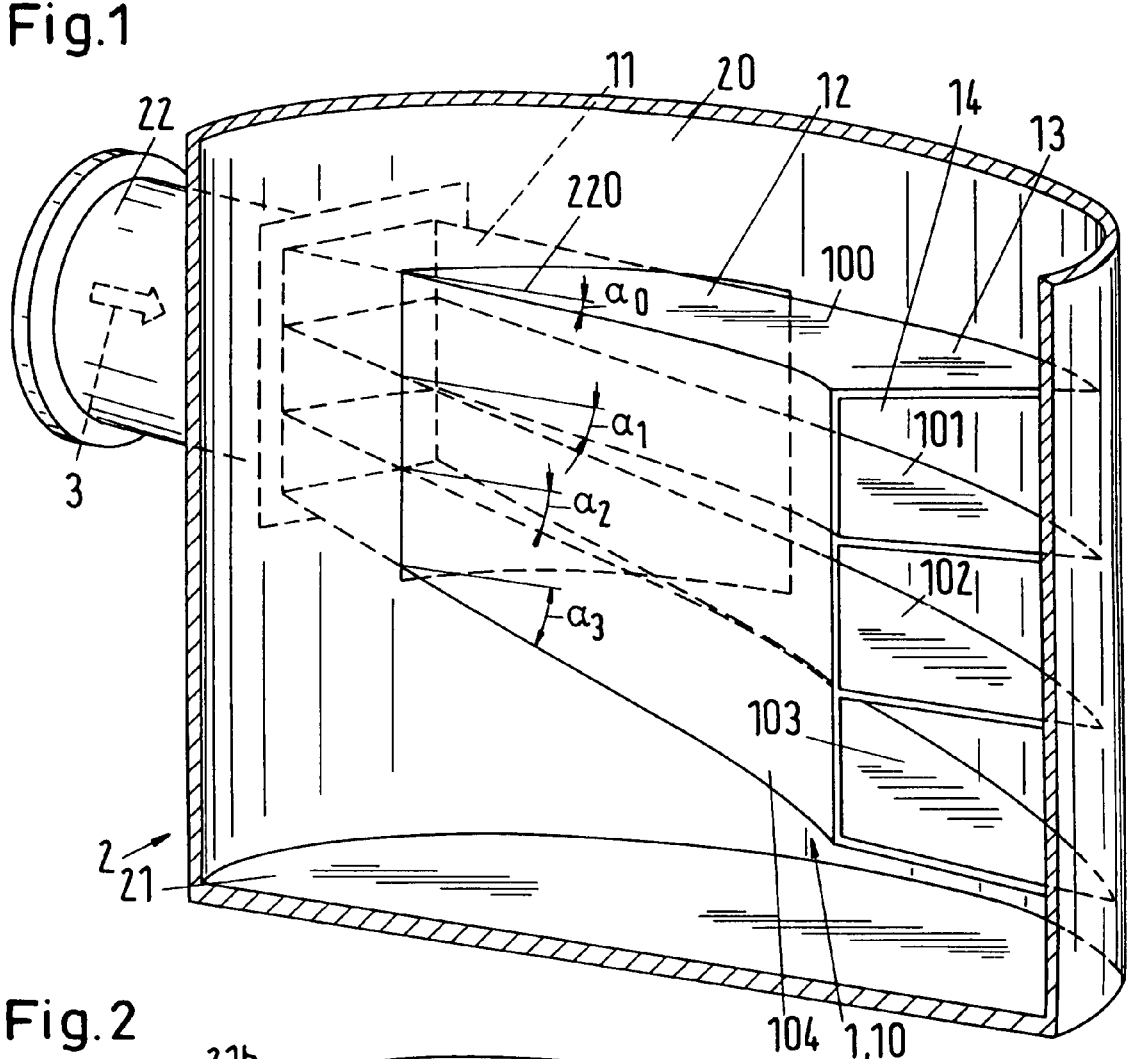
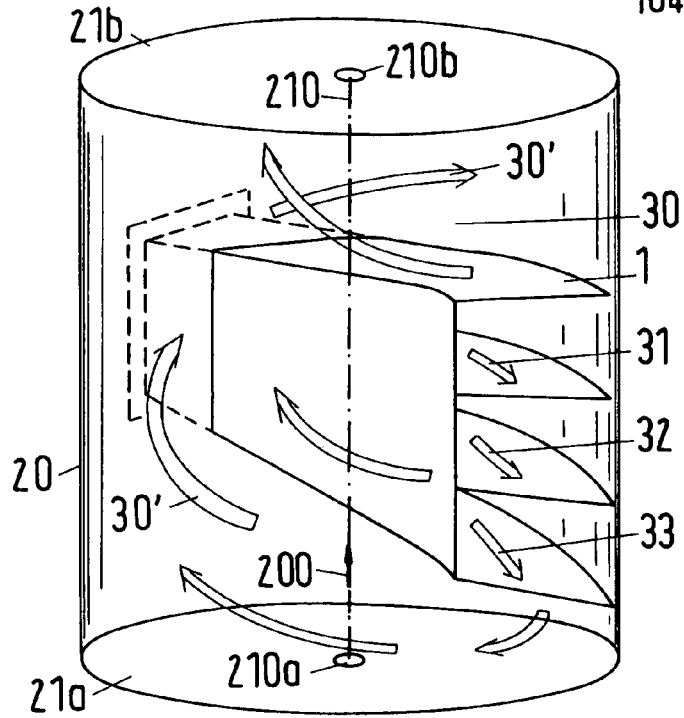

INLET DEVICE FOR A FLUID FED TANGENTIALLY INTO AN APPARATUS

This invention relates to an inlet device for a fluid fed tangentially into an apparatus. More particularly, this invention relates to a device for feeding a fluid tangentially into a column.

Various devices have been known for feeding fluids into various types of vessels, such as described in U.S. Pat. No. 4,336,228 that employs a spiral shaped guide vane following a vessel wall. The consequence of such an inlet device is an asymmetric distribution of the vertical flow velocity over the cross-section of the vessel. For the entry of the fluid flow into installations for separation or mass transfer located downstream of the inlet zone, for example packings, such an asymmetric distribution is disadvantageous, as it leads to a strong maldistribution in these installations and negatively influences their capacity as well as their efficiency.

In some cases, use has been made of an inlet horn to deliver the fluid within the vessel, such as described in U.S. Pat. Nos. 4,714,542 and 4,315,815; US Patent Application Publication 2003/0188851 and EP 1 279 428.

A fluid inlet device is also known from EP-A-1 588 749 (corresponding to US Patent Application Publication 2005/0236048), namely an inlet and distribution device for a liquid/vapor mixture, with which such a two-phase liquid can be fed into an apparatus, in particular into a column, with a liquid carried along in the fluid (in the form of droplets) is able to be separated simultaneously. In this fluid inlet device, a horn-shaped passage includes curved guide lamellae between two walls which are aligned horizontally and are arranged to abut the periphery of the apparatus. A tangentially inflowing fluid is branched off by the guide lamellae into a plurality of part flows which are deflected by the guide lamellae such that a denser phase of the fluid can be separated at least partly while using centrifugal forces. The stream is distributed over the cross-section of the apparatus using this fluid inlet device, whereas liquid is separated at the guide lamellae and the wall of the apparatus. This known horn-shaped fluid inlet device can naturally also be used for the feeding in of a single phase fluid (liquid or gas).

During operation, the part flows combine to form a vortex which forms a relatively uniform flow from which the fluid is distributed, for example, into a packing arranged above the fluid inlet device. Other installations can also be provided in the apparatus or in the column instead of the packing; for example, trays or a device for the separation of liquid droplets which are carried along and which were not already previously deposited on the curved guide lamellae.

The fluid inlet device consists of a sheet metal construction which extends largely over the whole periphery of the apparatus so that the fluid enters into the middle region of the apparatus at relatively high speeds of the part flows. There is, therefore, a relatively large difference in the static pressure between the center and the periphery in the vortex produced. In addition, a poor utilisation of the cross-section results across this device due to a widely extended dead space zone which has a weak flow through it.

A further inlet device is known from EP-A 0 440 412 with which a fluid flow can be guided in a ring passage along the periphery of the apparatus and can be distributed downwardly as part flows and from there inwardly while forming a vortex.

It is the object of the invention to provide an inlet device for a fluid to be fed tangentially into an apparatus which permits an improved feeding-in with respect to the known horn-shaped fluid inlet devices.

It as another object of the invention to provide a fluid inlet device that delivers a fluid at a reduced speed.

It as another object of the invention to provide a fluid inlet device that delivers a fluid in a vortex with an improved cross-section.

Briefly, the invention provides an inlet device for introducing a flow of fluid, in particular, a gas, into a column or like structure in a manner to create a vortex flow of the fluid within the column.

The column has a peripheral wall of predetermined diameter disposed on a vertical axis and at least one inlet device is provided for delivering fluid into an interior of the column.

In accordance with the invention, the inlet device includes an inlet stub having a predetermined cross-sectional area for delivering a flow of fluid at a first speed; and a horn-shaped passage piece extending from and communicating with the inlet stub for conveying the fluid into the column. This passage piece includes a marginal region of expanding cross-sectional area and has an outlet opening of greater cross-sectional area than the cross-sectional area of the inlet stub to deliver the fluid into the column at a lower speed than the speed of the flow from the inlet stub. During operation, droplets are separated and deposited most completely from a rotational flow forming downstream of the inlet device and, at the same time, a most even vertical velocity, related to the cross-section of the apparatus, downstream of the inlet device is obtained.

The marginal region of the inlet device abuts and extends along the peripheral wall of the column over an arcuate length of less than 180° of the peripheral wall to create a vortex flow of the fluid within the column.

The inlet device feeds the fluid tangentially into the column at the periphery wall of the column so that the fluid enters into a vortex flow after flowing through the horn-shaped passage piece. The vortex flow rotates around an axis adjacent to a central axis of the column that coincides with a main direction of the flowing fluid.

A discharge zone of the passage piece through which flow takes place presets a respective middle flow direction of the fluid which extends along the periphery and is inclined against the main direction.

A middle zone of the passage piece—or an entry zone and the middle zone—and the discharge zone are made in the manner of a diffuser together. A marginal region of the zones made in the manner of a diffuser lying inside the apparatus and abutting the periphery extends over less than one half of the periphery, preferably over less than one third of the periphery.

As the passage piece is formed as a diffusor, the inlet velocity of the fluid is decreased thereby. The decrease of the fluid velocity in the passage piece is accompanied by a substantially complete regain of pressure energy, as the diffusor is constructed such, that no eddies occur, so that friction losses are avoided to the largest extent as the fluid enters into the above-mentioned rotational movement following the curvature of the diffusor along the inner wall of the apparatus. This rotational movement is advantageous for depositing the droplets present in the fluid flow. In particular for the separation and deposition of small droplets, a high rotational velocity is advantageous.

If this diffusor is missing or if the channel is shaped as an open channel, a decrease is to be expected at most to a very small extent, which has the consequence, that a strong vortex flow forms in the apparatus downstream of the inlet device. This can lead to the problems mentioned in connection with the prior art. The vortex flow in the column induced by the rotational movement is decreased by use of the diffusor such that an even distribution of the vertical velocity is obtainable when entering a portion of the column situated above the inlet device, that means downstream, whereby this portion is, for example, a packing.

The deposition takes place primarily internally of the passage piece and, at most, immediately adjacently thereof, as long as the vortex flow substantially follows the wall. As the flow velocity is decreased at the exit of the passage piece, any liquid film present on the inner wall of the column can flow away without being captured again by the rotational movement.

In order to further influence the vortex flow of fluid within the column, at least one strip-shaped deflection member is mounted within the column downstream of the outlet opening of the marginal region for deflecting a portion of the fluid flow into a central portion of the column in an upward direction.

The vortex generated in the column following the deflection member(s) should not be too fast and even be delayed as the strong rotational flow inhibits, if not even prohibits, an even distribution of the vertical velocity in an upward direction. The deflection element(s) can be configured such, that they contribute to decrease the rotational velocity, so that a mostly even vertical velocity is obtained in the interior of the column.

These and other objects of the invention will become more apparent from the following detailed description taken in conjunction with the accompanying drawings wherein:

FIG. 1 illustrates an inlet device in accordance with the invention in a column;

FIG. 2 is a schematic illustration of the inner space of the column for the illustration of a vortex flow;

Figure 3:
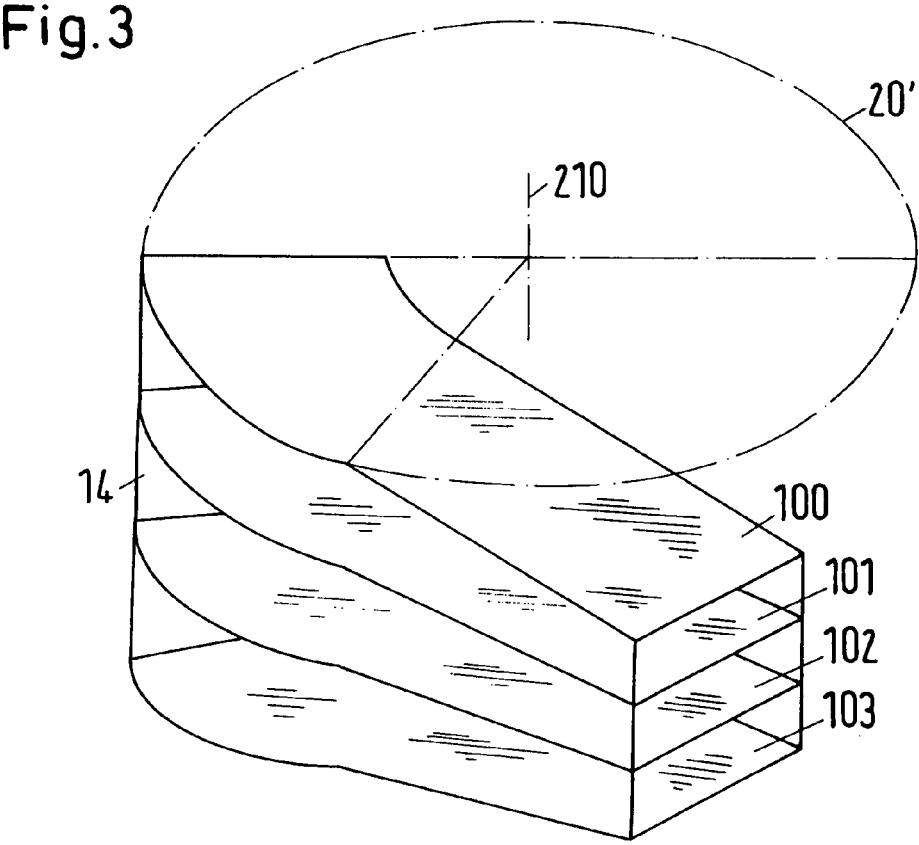
FIG. 3 illustrates a partial perspective view of the inlet device of FIG. 1.

Referring to FIG. 1, a column 2, or like apparatus, has a peripheral wall 20 disposed about a vertical axis 210 (see FIG. 2) and an inlet device 1 is provided for introducing a flow of fluid tangentially into the interior of the column 2.

The schematic representation in FIG. 2 shows a section of the inner space of the apparatus 2. This inner space is bounded by the peripheral wall 20, a lower cross-section 21a and an upper cross-section 21b. The center point 210a of the lower cross-section 21a, which corresponds to a base 21 in FIG. 1, is connected by the central axis 210 to the center point 210b of the upper cross-section 21b.

Referring to FIG. 1, the inlet device 1 includes an inlet connection stub 22 of circular cross-section having a predetermined cross-sectional area for delivering a flow of fluid 3 and a horn-shaped passage piece 10 extending from and communicating with the inlet stub 22 for conveying the fluid into the column 2.

The cross-section of the connection stub 22 changes over from a circular cross-section to a rectangular cross-section within the stub 22 so that the outlet cross-section is rectangular.

The horn-shaped passage piece 10 includes an inlet zone 11 communicating with the outlet of the inlet stub 22, a middle zone 12 and a discharge zone 13.

The inlet zone 11 has a cross-section area for the flow of fluid that remains constant and that is sized to the cross-sectional area of the outlet of the inlet stub 22.

The middle zone 12 and discharge zone 13 form a marginal region that is made in the manner of a diffuser. The marginal region is of expanding cross-sectional area and has an outlet opening 14 (i.e. a discharge surface) of greater cross-sectional area than the cross-sectional area of the outlet of the inlet stub 22. In addition, the marginal region is arcuately disposed about the vertical axis 210 (see FIG. 2) and extends over an arcuate length of less than 180° of a circumference about the axis 210 to create a vortex flow of the fluid within the column 2.

The marginal region of the zones 12,13 lies inside the column 2 and abuts the peripheral wall 20 to extend over a part of the peripheral wall 20 which is preferably smaller than one third of the periphery of the peripheral wall 20 in order to make sufficient space available for a vortex flow 30 of the fluid. The marginal region could also be larger, but should not take up more than one half of the periphery of the peripheral wall 20.

The passage piece 10 is divided into a plurality of diffuser-like part passages namely three part passages, in the marginal region made in the manner of a diffuser. The number of the part passages can, for example, also be two, four or five. Part flows are indicated in these part passages—see FIG. 2—by arrows 31, 32 and 33 that correspond to the respective mean flow directions (31,32,33) of the part flows.

The boundary of the zones made in the manner of a diffuser includes a wall formed by the peripheral wall 20 and three wall pieces: a horizontal wall piece 100 (perpendicular or almost perpendicular) abutting the wall 20 of the column, a vertical wall piece 104 extending vertically downwardly from the horizontal wall piece 100 and an inclined wall piece 103 extending from between the vertical wall piece 104 and the wall 20 of the column 2. With a vertical alignment of the central axis 210, these three wall pieces 100, 104 and 103 are an upper horizontal or almost horizontal wall piece, a vertical wall piece or a lower inclined wall piece. The three diffuser-like part passages are separated from one another by two transverse wall pieces 101 and 102.

The wall pieces 100, 101, 102 and 103 each include angles with a horizontal axis 220 of $\alpha_0$, $\alpha_1$, $\alpha_2$ or $\alpha_3$, to which $\alpha_0 < \alpha_1 < \alpha_2 < \alpha_3$ applies. For example, $\alpha_0$ is equal to zero (i.e. the wall piece 100 is horizontal) and the further angles differ by 5° in each case. This difference can be somewhat larger (preferably) or also smaller. In the marginal region of the passage piece 10 made in the manner of a diffuser, the surfaces of the cross-sections through which flow takes place expand by 20% to 200%, preferably by 50% to 150%. Related to the radial spacing between the central axis 210 and the peripheral wall 20, the radial width of the discharge surface 14 amounts to 25% to 80%, preferably 40% to 60%. The cross-sections may only expand relatively slowly so that a diffuser effect is not impaired by instabilities in the form of a fluctuating, partly released flow. Criteria for a flow stability in diffusers can be found, for example in a text book by Walter Traupel, "Thermische Turbomaschinen" [Thermal Turbo Machines], Volume 1, pages 139-141, 3rd Edition, Springer Verlag 1977).

Referring to FIG. 2, in operation, the fluid 3 first flows through the connection stub 22 and subsequently through the horn-shaped passage piece 10 at the peripheral wall 20 of the column 2. The fluid 3 leaves the passage piece 10 through the discharge zone 13 and the outlet opening 14 thereof and enters into a vortex flow 30 indicated by arrows 30'. This vortex flow 30 has an axis of rotation which is inclined adjacent to the central axis 210 of the column 2 or extends parallel thereto. The central axis 210 coincides with a main direction 200 of the flowing fluid 3.

The discharge zone 13 presets a middle flow direction 32 of the fluid 3 at the outlet opening 14 which extends along a plane, i.e. substantially parallel to said plane, which is a tangential plane to the peripheral wall 20. The middle flow direction 32 is inclined against the main direction 200 and includes an angle of a maximum of 30° with a plane perpendicular to the central axis 210. The base 21 (see FIG. 1) can seal the inner space of the column 2 toward the bottom. The upper edge of a packing bed, tray or distributor located thereunder can also be located at this position.

FIG. 3 shows the division of the inlet device 1 into three part passages, as it appears to the observer from outside the apparatus. In this context, the chain-dotted curve 20' is the intersection line between the peripheral wall 20 and the horizontal plane in which the upper wall piece 100 lies. A corresponding representation is given in FIG. 4, with only the discharge outlet 14 of the inlet device 1 being shown.

Figure 4:
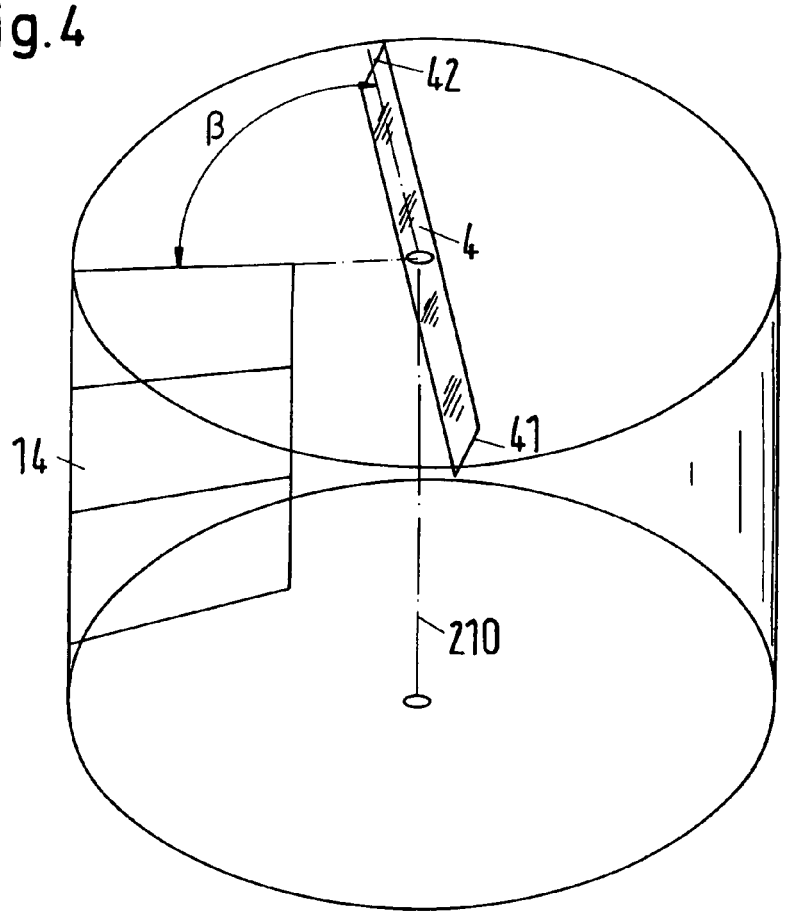
FIG. 4 is a schematic representation which shows a deflection member for influencing the vortex flow in accordance with the invention.

Referring to FIG. 4, a deflection member 4 with which the vortex flow 30 can be favourably influenced is provided downstream after the discharge zone 13 and between the central axis 210 and the peripheral wall 20. This deflection member 4 forms a strip between a foot end 41 and a head end 42, the longitudinal extent of the strip being parallel to the central axis 210 or being inclined up to an angle of 30° with respect thereto, with the foot end 41 following downstream after the head end 42.

The deflection member 4 is advantageously fastened to or close to the wall 20 of the column.

The fastening is foreseen along an edge of the deflection member 4 which corresponds to the longitudinal extension of the strip. Preferably, a single deflection member 4 is used, however, two or more such deflection members can be fastened at equal or variable distances to the peripheral wall 20. The lateral dimension of the deflection members can vary.

The deflection members can be perforated so that only a part of the fluid flow is deflected, whereas the other part flows through such a deflection member. The perforation, i.e. opening, is, for example, obtained by a regular pattern of holes, whereby the resulting free area amounts from about 5 to 60% of the deflection member, preferably from about 5 to 40% of the surface area of the deflection member. Typical hole diameters are in the range of about 12 mm, however other dimensions are also possible. The use of a perforation is advantageous, as a portion of the fluid flow, which is deflected and/or delayed, can continue flowing through the perforations and executing a rotational movement, so that the whole cross-section of the column is flowed through.

Alternatively or in addition thereto, at least a longitudinal slit (i.e. opening) can be made in at least one deflection member 4. The longitudinal slit can, in particular, also be placed adjacent to the inner wall of the column, so that a fluid film flowing along the inner wall is not barred by the deflection member 4.

The outlet opening 14 of the outlet zone 13 and the deflection member 4 set up an angle β around the central axis 210 whose amount lies between 30° and 150°. At least one of the deflection member(s) 4 has a surface on which the fluid flow impinges and which is smaller than twice the outlet opening 14 of the outlet zone 13.

The angle β describes the angular distance between the exit of the horn-shaped passage and the deflection member 4. If the deflection member 4 is vertical, this angle is clearly defined. If the deflection element is not vertical, the angle β is measured in a plane containing the upper edge of the horn shaped passage and being normal to the central axis of the column. The angle β is the angular distance between this upper edge and the portion of the deflecting member 4 intersecting this plane.

Depending on the diameter of a column 2 and on the amount of the fluid to be fed in, a plurality of the inlet devices 1 can be arranged in a column section on the same plane or on different horizontal planes 220 offset with respect to one another. In the case with two inlets, they are preferably diametrically opposite to one another. The two inlet devices 1 can be aligned with respect to one another so that the fluids flow into the apparatus 2 with opposite senses; the deflection member 4 can then be dispensed with as a rule.

The inlet device 1 with the horn-shaped passage piece 10 can be used for the feeding in and distribution of a fluid. The fluid can be multiphase or single-phase, in particular, a gas flow which is loaded with a denser phase, for example liquid droplets, or a gas flow which only consists of one substance or of a single-phase substance mixture. In this connection, a dispersed phase of higher density can be separated at least partly utilising its inertia in the horn-shaped passage piece.

The invention thus provides an inlet device that produces a very good speed distribution as could not be reached with known devices with a tangential fluid inlet. This is possible due to the design of the supply passages in the manner of a diffuser and to the controlled delay of the flow effected thereby.

The use of a deflection member results in an additional improvement of the speed distribution.

The invention further provides an inlet device wherein a condensate carried along in the fluid is also separated with good efficiency due to the peripheral arrangement.

What is claimed is:

1. An inlet device comprising
   an inlet stub having a predetermined cross-sectional area for delivering a flow of fluid; and
   a horn-shaped passage piece extending from and communicating with said inlet stub for conveying the fluid, said passage piece including a marginal region of expanding cross-sectional area, said marginal region having an outlet opening at an end thereof of greater cross-sectional area than said cross-sectional area of said inlet stub, said marginal region being arcuately disposed about a vertical axis and extending over an arcuate length of less than 180° of a circumference about said axis, said marginal region including a plurality of wall pieces transverse to said axis and dividing said marginal region into at least three vertically disposed diffuser-like passages, each said passage communicating with said inlet stub and having an expanding cross-sectional area and an outlet opening.

2. An inlet device as set forth in claim 1 wherein each said wall piece is disposed on a vertical angle relative to an adjacent one of said transverse wall pieces.

3. An inlet device as set forth in claim 2 wherein said angle is 50°.

4. In combination,
   a column having a peripheral wall of predetermined diameter disposed on a vertical axis;
   at least one inlet device for delivering fluid into an interior of said column, said inlet device including an inlet stub having a predetermined cross-sectional area for delivering a flow of fluid at a first speed; and
   a horn-shaped passage piece extending from and communicating with said inlet stub for conveying the fluid into said column, said passage piece including a marginal region of expanding cross-sectional area and having an outlet opening of greater cross-sectional area than said inlet stub to deliver the fluid into said column at a lower speed than said first speed, said marginal region abutting and extending along said peripheral wall of said column over an arcuate length of less than 180° of said peripheral wall to create a vortex flow of the fluid within said peripheral wall, said marginal region including a plurality of wall pieces transverse to said vertical axis and dividing said marginal region into at least three vertically disposed diffuser-like passages, each said passage communicating with said inlet stub and having an expanding cross-sectional area and an outlet opening.

5. The combination as set forth in claim 4 wherein each said wall piece is disposed on a vertical angle relative to an adjacent one of said wall pieces.

6. The combination as set forth in claim 4 wherein the cross-sectional area of each said diffuser-like passage expands from 20% to 200%.

7. The combination as set forth in claim 4 wherein the cross-sectional area of each said diffuser-like passage expands from 50% to 150%.

8. The combination as set forth in claim 4 wherein said outlet opening of said marginal region has a radial width relative to said diameter of said peripheral wall of from 40% to 60% of the radius of said peripheral wall.

9. The combination as set forth in claim 4 wherein said outlet opening of said marginal region has a radial width relative to said diameter of said peripheral wall of from 25% to 80% of the radius of said peripheral wall.

10. The combination as set forth in claim 4 further comprising at least one strip-shaped deflection member mounted within said column downstream of said outlet opening of said marginal region for deflecting the flow of fluid therefrom, said deflection member being disposed between said, vertical axis and said peripheral wall and having a foot end and a head end will, said foot end following downstream of said head end relative to the flow of fluid from said marginal region.

11. The combination as set forth in claim 10 wherein said deflection member is disposed relative to said vertical axis on an angle of from 0° to 30° relative to said vertical axis.

12. The combination as set forth in claim 10 wherein said deflection member forms an angle of from 30° to 150° relative to a plane of said outlet opening of said marginal region.

13. In combination,
a column having a peripheral wall of predetermined diameter disposed on a vertical axis;
at least one inlet device for delivering fluid into an interior of said column, said inlet device including an inlet stub having a predetermined cross-sectional area for delivering a flow of fluid at a first speed; and a horn-shaped passage piece extending from and communicating with said inlet stub for conveying the fluid into said column, said passage piece including a marginal region of expanding cross-sectional area and having an outlet opening of greater cross-sectional area than said inlet stub to deliver the fluid into said column at a lower speed than said first speed, said marginal region abutting and extending along said peripheral wall of said column over an arcuate length of less than 180° of said peripheral wall to create a vortex flow of the fluid within said peripheral wall; and
at least one strip-shaped deflection member mounted within said column downstream of said outlet opening of said marginal region for deflecting the flow of fluid therefrom, said deflection member being disposed between said vertical axis and said peripheral wall and having a foot end and a head end with said foot end following downstream of said head end relative to the flow of fluid from said marginal region said deflection member having at least one opening therein for passage of a fluid flow.

14. The combination as set forth in claim 13 wherein said one deflection member has a plurality of openings therein whereby the resulting free area amounts from about 5 to 60% of the surface area of said one deflection member.

15. The combination as set forth in claim 4 further comprising a plurality of said inlet devices disposed in circumferentially spaced relation about said column.

16. The combination as set forth in claim 15 wherein at least two of said inlet devices are disposed in said column to deliver fluid in opposing directions.

17. In combination,
a column having a peripheral wall of predetermined diameter disposed on a vertical axis;
at least one inlet device for delivering fluid tangentially into an interior of said column, said inlet device including an inlet stub having a predetermined cross-sectional area for delivering a flow of fluid at a first speed; and a horn-shaped passage piece extending from and communicating with said inlet stub for conveying the fluid tangentially into said column, said passage piece including a marginal region of expanding cross sectional area, said marginal region having an outlet opening into said column of greater cross-sectional area than said inlet stub to deliver the fluid tangentially into said column at a lower speed than said first speed, said marginal region abutting and extending along said peripheral wall of said column over an arcuate length of less than 180° of said peripheral wall to create a vortex flow of the fluid within said peripheral wall.

* * * * *